UNITED STATES PATENT OFFICE.

JAMES PAUL SCHROEDER, OF WASHINGTON, DISTRICT OF COLUMBIA.

PROCESS FOR TREATING PEAT AND MUCK FOR THE PREPARATION OF FERTILIZER.

1,254,366.     Specification of Letters Patent.     Patented Jan. 22, 1918.

No Drawing.     Application filed August 22, 1917. Serial No. 187,516.

(DEDICATED TO THE PUBLIC.)

*To all whom it may concern:*

Be it known that I, JAMES PAUL SCHROEDER, a citizen of the United States of America, and an employee of the Department of Agriculture of the said United States, residing at Washington, in the District of Columbia, (whose post-office address is Washington, D. C.,) have invented a new and useful Process for Treating Peat and Muck for the Preparation of Fertilizer.

This application is made under the act of March 3, 1883, chapter 143 (22 Stat., 625), and the invention herein described and claimed may be used by the Government of the United States or any of its officers or employees in the prosecution of work for the Government, or any person in the United States, without payment of any royalty thereon.

Peat, which term in the following specification includes the term muck, is partially decomposed vegetable matter which contains varying quantities of nitrogen ranging from one to six per cent. This nitrogen is largely, about ninety-seven to ninety-nine per cent., in the form of complex proteins and related compounds and decomposition products of these. When extracted with boiling sulfuric or hydrochloric acids it is shown to be changed chiefly into the products of primary protein decomposition. The nitrogen in the form of ammonia in the raw peat is generally as low as one and one-half to one-tenth per cent. of the total nitrogen present.

Raw peat is generally acid in reaction, the acidity ranging from a slight reaction to one requiring as high as one hundred tons lime per acre foot for neutralization. This acidity is due to the presence of organic acids, generally designated as humic and ulmic acids. The use of peat for horticultural and agricultural purposes requires that this acidity be neutralized. This can, and is generally done, by the use of lime. However, the use of lime for this purpose results in the formation of insoluble calcium salts of the acids which are neutralized and thus defeats the main purpose to which the material is to be put because it renders insoluble the humus nitrogen, the solubility of which determines the value of the peat for fertilizer. This action of lime on the humus matter is best shown by the ordinary method of determining humus in which the sample is first leached with dilute hydrochloric acid solution to remove the lime so that the humic substance will be set free and can be extracted with dilute ammonia solution.

In preparing the raw peat for treatment by my process for the production of fertilizer this action of lime on the humic acids present is taken into consideration and ammonia is used for the neutralization instead of lime. This leaves the organic acids neutralized in soluble form. In addition the ammonia added in this way adds to the direct fertilizer value of the material in direct proportion to the quantity used, so that the cost of this chemical need not be considered. The quantity of ammonia added is so regulated that it is just sufficient to neutralize the material or leave it slightly alkaline. For convenience the neutralization is carried on in special boilers prepared for the treatment of the peat by my process.

This process consists in digesting the neutral or slightly ammoniacal mass in the closed boilers under a moderate steam pressure until the reaction is completed. Heating under steam pressure results in the hydrolysis or splitting up of the complex protein compounds of the peat into simpler compounds which are essentially primary decomposition products of the former and consequently are soluble and more readily available for plant use. The process of digestion is similar to that commonly employed in the "tanking process" of rendering garbage for the production of garbage tankage.

After the process of digestion is complete the peat is conveyed from the boilers to the driers where the excess moisture is driven off. This can conveniently be done in rotary kilns. The dried material should contain in the neighborhood of thirty-five per cent. moisture.

The material as it issues from the driers is a finely divided powder, neutral, or nearly neutral in reaction, and sterile. The complex compounds of the original substance have been broken up into comparatively simple substances which are soluble in water and available for plant metabolism, some of them as such, and others through the aid of bacterial action in the soil, where the processes of ammonification and nitrification are operative.

With the hydrolysis of the compounds complete as in my process there is not the tendency of the peat to revert to an acid state on standing that is common when the peat is merely neutralized as is ordinarily done. Any danger of a slight reversion to acid reaction can, however, be easily obviated by mixing after drying with a small quantity of ammonium sulfate and calcium carbonate, for example one or two hundred pounds of the former and a couple hundred pounds of the latter per ton of peat. The interaction of the two substances results in the formation of calcium sulfate and the liberation of carbon dioxid and ammonia at a very slow rate and the latter being generated throughout the mass neutralizes any tendency toward acidity.

The material at this stage may be advantageously inoculated with bacteria that will have a further beneficial influence. If the fertilizer is to be used for growing leguminous crops I inoculate with strains that are known to be adapted to the particular legume for which the fertilizer is to be used. When it is to be used for crops other than the legumes, I also add mixed cultures of *Bradicicola*, azotibacters and nitrifying bacteria. These cultures have the power of materially increasing the nitrogen content of the mass on standing and the nitrifying bacteria are active in converting a considerable portion of the more readily nitrifiable nitrogen into nitrates which is immediately available for plant use when the fertilizer is placed in the soil. These cultures of bacteria are grown by the ordinary known methods and a small portion of prepared peat is then inoculated and incubated to develop a very great concentration of the bacteria and this is then mixed with the digested and dried peat as it comes from the driers and goes into the mixers. To stimulate the growth and activity of these bacteria I add, when obtainable, a small quantity of what is known as beet sugar residues, or molasses. This contains a large percentage of sugar, which serves as a readily available energy material for the growth of the bacteria, and magnesium salts and some phosphates which also have a beneficial influence. When this material is not available the necessary chemicals are added.

A variation from the above procedure may be employed if the time is available between the time of treatment and shipment for application to the soil by inoculating the moist peat when it comes from the digesters with the proper bacteria and storing in specially constructed bins or tanks provided with mechanical stirring device by means of which the material can be stirred and aerated. To supply the air to the material which is essential for the processes of nitrogen fixation and nitrification the bottoms of the tanks are supplied with coils of pipes, perforated on the side, through which air is blown by pressure at intervals. This and occasional stirring by means of the mechanical device supplies the material with sufficient fresh air for the fermentation to proceed.

Having described my invention, I claim:

1. A process for the treatment of peat for the production of fertilizer which consists of digesting raw peat, which has been made slightly alkaline with ammonia, under steam pressure whereby the nitrogenous compounds occurring in it in the form of complex, insoluble proteins are hydrolyzed into simple compounds which are soluble in water and available for plant use.

2. A process for the preparation of a fertilizer from peat that will not revert to an acid reaction which consists in mixing intimately with the peat, hydrolyzed by digesting with steam under pressure, a small portion of ammonium sulfate and calcium carbonate which interact slowly and generate ammonia throughout the mass and neutralize any tendency to revert to an acid reaction.

In testimony whereof, I affix my signature in the presence of two subscribing witnesses.

JAMES PAUL SCHROEDER.

Witnesses:
  CHARLES W. BOYLE,
  GEORGE A. SHAW.